US009483282B1

(12) United States Patent
Vandervennet et al.

(10) Patent No.: US 9,483,282 B1
(45) Date of Patent: Nov. 1, 2016

(54) METHODS AND SYSTEMS FOR RUN-TIME HARDWARE CONFIGURATION CHANGE MANAGEMENT

(71) Applicant: Altera Corporation, San Jose, CA (US)

(72) Inventors: Yves F. Vandervennet, Austin, TX (US); Alan Douglas Tull, Austin, TX (US); Steve Jahnke, Allen, TX (US)

(73) Assignee: Altera Corporation, San Jose, CA (US)

( * ) Notice: Subject to any disclaimer, the term of this patent is extended or adjusted under 35 U.S.C. 154(b) by 180 days.

(21) Appl. No.: 14/292,060

(22) Filed: May 30, 2014

(51) Int. Cl.
*G06F 1/24* (2006.01)
*G06F 15/177* (2006.01)
*H04M 1/68* (2006.01)
*G06F 9/445* (2006.01)
*G06F 9/44* (2006.01)

(52) U.S. Cl.
CPC ......... *G06F 9/44505* (2013.01); *G06F 9/4411* (2013.01)

(58) Field of Classification Search
CPC .................................................... G06F 9/4411
USPC .......................................................... 713/100
See application file for complete search history.

(56) References Cited

U.S. PATENT DOCUMENTS

| | | | | |
|---|---|---|---|---|
| 7,228,405 | B2 * | 6/2007 | Rothman et al. | 713/1 |
| 7,290,244 | B2 * | 10/2007 | Peck et al. | 717/109 |
| 8,364,946 | B2 * | 1/2013 | Ishebabi | 713/100 |
| 8,402,409 | B1 * | 3/2013 | Janneck et al. | 716/117 |
| 8,726,250 | B2 * | 5/2014 | Vorbach et al. | 717/149 |
| 2009/0170472 | A1 * | 7/2009 | Chapin et al. | 455/410 |
| 2011/0099562 | A1 * | 4/2011 | Nandy et al. | 719/320 |
| 2012/0284711 | A1 * | 11/2012 | Niesser et al. | 718/1 |

* cited by examiner

*Primary Examiner* — Suresh Suryawanshi
(74) *Attorney, Agent, or Firm* — Fletcher Yoder, P.C.

(57) ABSTRACT

This disclosure relates to systems and methods for reconfiguring hardware at run-time. In multi-tasking environments, applications may depend on specific hardware configurations for their execution. The run-time hardware configuration change management API can receive hardware configuration requests from applications, accept or deny configuration requests, arbitrate conflicting configuration requests, and apply configuration requests.

20 Claims, 3 Drawing Sheets

METHODS AND SYSTEMS FOR RUN-TIME HARDWARE CONFIGURATION CHANGE MANAGEMENT

BACKGROUND OF THE DISCLOSURE

This disclosure relates to systems and methods for reconfiguring hardware at run-time.

An embedded computer generally refers to a computer system that performs a dedicated function. Such systems often have to satisfy real-time computing requirements. From a hardware standpoint, most embedded computers are not reconfigurable, i.e., the set of features is fixed and cannot be changed at run-time, which is the time during which a program is running.

One configuration for implementing embedded systems is a system on a chip (SoC), which may be an integrated circuit integrating all components of a computer—such as digital, analog, mixed-signal, and radio frequency functions—on a single chip substrate. SoCs may be implemented using an application specific integrated circuit (ASIC) or a field programmable gate array (FPGA). In particular, an FPGA is field programmable, i.e., it is an integrated circuit designed to be configured by a user after it has been manufactured. This aspect of FPGAs opens up the possibility of reconfiguring the hardware of embedded systems at run-time.

However, an operating system (OS) running on embedded computers generally expects the hardware configuration of the embedded computer to be fixed and is not designed to manage configuring and/or reconfiguring hardware that changes over time. While an OS may be able to arbitrate the use of fixed hardware, the OS may not be capable of handling configuring and/or reconfiguring hardware that changes over time. Therefore, it would be desirable to have a framework that enables applications to request a specific hardware configuration of the embedded computer and that can manage the SoCs resources.

SUMMARY OF THE DISCLOSURE

To address the above and other shortcomings within the art, the present disclosure provides methods and systems for enabling applications to request a specific hardware configuration of the embedded computer and managing the SoC resources.

In accordance with the present invention there is provided a method for configuring hardware circuitry at run-time. The method includes receiving, at a management module, a first request for configuring the hardware circuitry at run-time from a first application and a second request for configuring the hardware circuitry at run-time. The management module may identify a conflict between the first request and the second request and select one of the first request and the second request for configuring the hardware circuitry at run-time. The hardware circuitry may be configured at run-time using the selected one of the first request and the second request.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
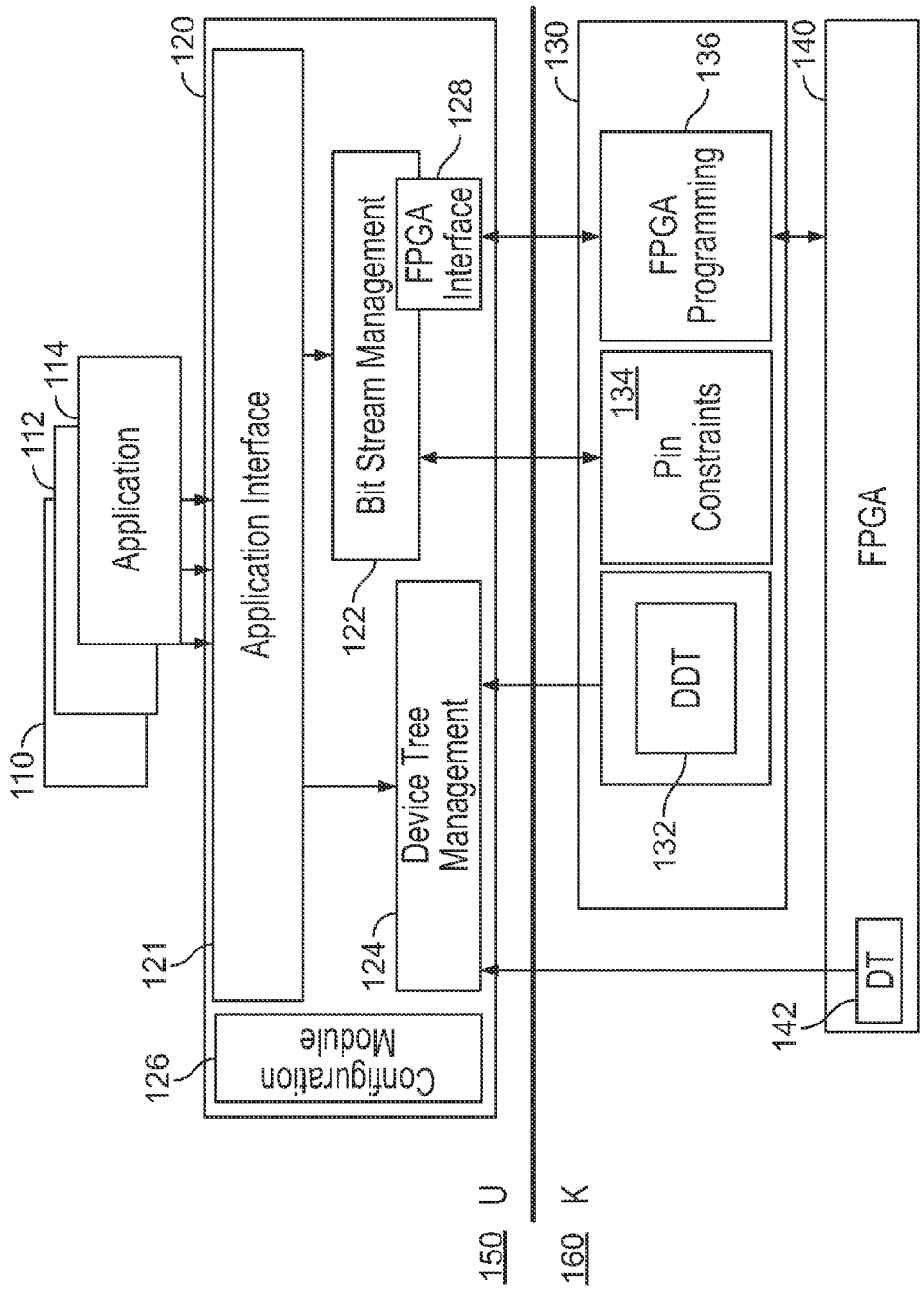
FIG. 1 is a simplified block diagram of an architecture for a run-time hardware configuration change management system, according to an illustrative embodiment.

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The integration of FPGAs with SoCs enables run-time configuration and reconfiguration of embedded hardware components. For example, hardware components that may be configured or reconfigured at run-time may be any components of the FPGA.

An exemplary use case of such configuration and/or reconfiguration of embedded hardware is the following: Two applications are running on an embedded computer. The first application is a video application which requires video processing hardware for optimal operation; the second application is an encryption/decryption application which requires corresponding hardware acceleration for optimal operation. The first and the second applications thus require two different embedded hardware configurations for optimal operation. The FPGA of the embedded computer is capable of being configured to provide the hardware acceleration desired by both applications. Applications may accordingly request a certain configuration of the embedded hardware.

A configuration of the embedded hardware may be characterized by any one of, or a combination of, an FPGA bitstream, a set of device drivers, a description of the hardware, and a memory map. Accordingly, an application requesting a desired configuration and/or reconfiguration of embedded hardware may specify its request via any one of, or a combination of, an FPGA bitstream, a set of device drivers, a description of the hardware, and a memory map. An FPGA bitstream may be a functional definition of the FPGA. It may be received from an off-chip source. A device driver may be a computer program that operates or controls a particular type of device attached to a computer. A memory map may be a data structure that indicates how computer memory is laid out.

Some FPGAs support partial reconfiguration, which is the process of changing a portion of reconfigurable hardware circuitry while the other part is still operating. An FPGA may be partially reconfigured by loading a partial reconfiguration bitstream onto the FPGA. However, FPGAs that support partial reconfiguration are typically not capable of handling configuration and/or reconfiguration requests from multiple applications at run-time. In order to support partial reconfiguration at run-time, a framework to control reconfiguration requests received from various applications may be advantageous. Referring back to the example described above, it may additionally be advantageous for such a framework to be able to arbitrate reconfiguration requests received from various applications.

Operating systems, e.g., Linux, do not provide an application programming interface (API) that enables concurrent users or applications to request a configuration and/or reconfiguration of embedded hardware at run-time. Arbitration of concurrent requests for configuration and/or reconfiguration of embedded hardware at run-time is also not supported.

FIG. 1 is a simplified block diagram of an architecture for a run-time hardware configuration change management system, according to an illustrative embodiment. Run-time hardware configuration change management architecture 100 may be used by applications to request configuration and/or reconfiguration of embedded hardware.

In some embodiments, at least some components of run-time hardware configuration change management architecture 100 may be located on an integrated circuit, an application-specific integrated circuit (ASIC), an application-specific standard product (ASSP), a Programmable Logic Device (PLD), a Field Programmable Gate Array (FPGA), a full-custom chip, or a dedicated chip. It should also be understood that the run-time hardware configuration change management architecture may be located on a combination of devices, such as a FPGA and an ASIC, and/or may include additional, stand-alone circuit components.

In some embodiments, run-time hardware configuration change management architecture 100 may be implemented as an API of the OS of the embedded computer. The psuedo-code below may provide an exemplary description of the API.

config_t*register_configuration(config_t*config) int unregister_configuration(config_t confgh)
int check_configuration(config_t*config)
int apply_configuration(confgh_t confgh) int release_configuration(confgh_t confgh)
int list_configurations(config_t*configs) int release_allconfigurations(void);

The run-time hardware configuration change management API may receive hardware configuration requests from applications, accept or deny configuration requests, arbitrate conflicting configuration requests, and apply configuration requests, as described in greater detail below.

An OS generally separates virtual memory into user space and kernel space. User space refers to the memory area where all application software and some drivers execute. Kernel space refers to the memory area that is restricted to running privileged kernel and most device drivers.

Run-time hardware configuration change management architecture 100 may be an API implemented in the OS of an embedded computer. Run-time hardware configuration change management architecture 100 may include FPGA management module 120 and kernel space module 130. FPGA management module 120 may reside in user space 150 and may interface with applications 110, 112, and 114, and kernel space module 130. Kernel space module 130 may reside in kernel space 160 and may interface with the embedded hardware, such as FPGA 140, to be configured and/or reconfigured at run-time.

Applications 110, 112, and 114, which may reside in user space 150, are merely illustrative. In practice, FPGA management module 120 may interface with more or fewer applications than shown in FIG. 1. Each of applications 110, 112, and 114 may have corresponding priorities and security privileges which may determine when, if at all, their requests for configuration and/or reconfiguration of embedded hardware may be granted. Such functionality is described in greater detail in connection with FPGA management module 120 below.

Applications 110, 112, and 114 may transmit configuration and/or reconfiguration requests associated with FPGA 140 to FPGA module 120. Configuration and/or reconfiguration requests may be in the form of bitstreams for FPGA 140. Configuration and/or reconfiguration requests made by applications 110, 112, and 114 may be blocking or non-blocking interface calls to the API.

FPGA management module 120 may include application interface 121, bit stream management module 122, device tree management module 124, configuration module 126, and FPGA interface 128.

Application interface 121 may receive requests for configuration and/or reconfiguration of embedded hardware from applications 110, 112, and 114 directed to the API implementing run-time hardware configuration change management architecture 100. Application interface 121 may be communicatively coupled to bitstream management module 122 and device tree management module 124.

Application interface 121 may parse the requests for configuration and/or reconfiguration of embedded hardware received from applications 110, 112, and 114. For example, the configuration and/or reconfiguration requests received from applications 110, 112, and 114 may be received in respective containers. Application interface 121 may parse each container to extract the bitstreams corresponding to the requests for configuration and/or reconfiguration of embedded hardware received from applications 110, 112, and 114.

Application interface 121 may provide additional features associated with APIs such as supporting synchronous calls to the API or asynchronous calls to the API. Application interface 121 may also support blocking and non-blocking interface functionality of the API. Application interface 121 may rely on bitstream management module 122 for supporting such functionality, as described in greater detail below in connection with bitstream management module 122.

For example, to support a blocking interface call to the API, application interface 121 may suspend or "block" the application that transmitted a request to configure and/or reconfigure embedded hardware to the API if the embedded hardware configuration requested by the application is unavailable. When the requested embedded hardware configuration becomes available, the requesting application may be woken up and be scheduled according to its priority or security privileges. If an application makes a non-blocking interface call to the API and the embedded hardware configuration requested by the application is unavailable, the requesting application may give up and try making the request again later. Thus, application interface 121 may not suspend the requesting application if the application make a non-blocking interface call to the API.

Bitstream management module 122 may analyze and check bitstreams for FPGA 140 extracted by application interface 121 from requests for configuration and/or reconfiguration of embedded hardware received from applications 110, 112, and 114. Bitstream management module 122 may be communicatively coupled to application interface 121, FPGA interface 128, and pin constraints module 134. The following checks may be performed by bit stream management module 122 in any suitable order.

First, it may be determined whether a received bitstream is valid for FPGA 140. For example, it may be determined whether a received bitstream satisfies requirements for being loaded onto the embedded hardware.

Second, a received bitstream may be analyzed to determine which resources of the embedded hardware, e.g., FPGA 140, are being requested for configuration and/or reconfiguration. The resources of the embedded hardware currently available, i.e., resources not in current use, and resources of the embedded hardware currently unavailable, i.e., resources already in use, may additionally be determined. Such information by be determined via device tree management module 124, as described in greater detail below in connection with device tree management module 124. Information regarding the resources of the embedded hardware currently available may also be available for display or listing to the user.

Resources of the embedded hardware requested for configuration and/or reconfiguration by a received bitstream may be compared to the resources of the embedded hardware currently available. Blocking and non-blocking interface functionality of the API may be supported on the basis of such a comparison. For example, the requesting application may be blocked till the embedded hardware configuration requested by the application is available or instructed to try re-making the request at a later time if the embedded hardware configuration requested by the application is unavailable.

Third, it may be determined whether a received bitstream is appropriate for the board on which the embedded hardware is implemented. In particular, it may be determined whether a received bitstream matches a board implementing the embedded hardware. For example, electrical characteristics such as pin constraints of the board corresponding to the requested configuration may be determined from a received bitstream. The electrical characteristics determined from a received bitstream may be matched to the electrical characteristics of the board implementing the embedded hardware whose configuration and/or reconfiguration is requested. The electrical characteristics of the board may be determined via pin constraints module 134 residing in kernel space module 130 as described in greater detail below in connection with pin constraints module 134.

Bit stream management module 122 may manage security privileges associated with received requests for configuring and/or reconfiguring embedded hardware. For example, security privileges may be assigned on a per application or a per user basis, or a combination of both.

If security privileges are assigned on a per application basis, a data structure, such as a list, may be maintained of applications that can or cannot make requests for configuring and/or reconfiguring embedded hardware. For example, a black list and a white list of applications may be maintained where applications appearing on the black list cannot make requests for configuring and/or reconfiguring embedded hardware while applications appearing on the white list can make requests for configuring and/or reconfiguring embedded hardware.

If security privileges are assigned on a per user basis, security privileges may be assigned to users in a manner similar to the assignment of security privileges to applications as described above. Security privileges may also be assigned on the basis of groups of users rather than individual users. For example, a data structure, such as a list, may be maintained of certain users or groups of users that can or cannot make requests for configuring and/or reconfiguring embedded hardware. As an example, Alice and Bob may be allowed to make requests for configuring and/or reconfiguring embedded hardware while Charlie and David may not be allowed to make requests for configuring and/or reconfiguring embedded hardware. Any of Alice, Bob, Charlie, and David may be future users of the embedded hardware.

Security privileges may additionally and/or alternatively be assigned on the basis of device drivers associated with received requests for configuring and/or reconfiguring embedded hardware. For example, an application may be prevented from making requests for configuring and/or reconfiguring embedded hardware if the application requests a configuration of the embedded hardware that is recognized as requiring the use of a device driver that is known to be unstable, e.g., belongs to a black list of Linux device drivers.

Bitstream management module 122 may manage priorities associated with requests for configuring and/or reconfiguring embedded hardware received from applications. Similar to security privileges, priorities may be assigned on a per application or a per user basis, or a combination of both.

If priorities are assigned on a per application basis, a data structure, such as a list, may be maintained of the priorities of applications that can make requests for configuring and/or reconfiguring embedded hardware. For example, requests for configuring and/or reconfiguring embedded hardware received from applications with higher priorities may be processed before requests for configuring and/or reconfiguring embedded hardware received from applications with lower priorities.

If priorities are assigned on a per user basis, a data structure, such as a list, may be maintained of the priorities corresponding to users that can make requests for configuring and/or reconfiguring embedded hardware. For example, requests for configuring and/or reconfiguring embedded hardware received from users with higher priorities may be processed before requests for configuring and/or reconfiguring embedded hardware received from users with lower priorities.

Bitstream management module 122 may arbitrate conflicts between requests for configuring and/or reconfiguring embedded hardware received from different applications. Referring back to the example described above, if a first application, which is a video application, requests a configuration of the embedded hardware that provides video processing acceleration, and a second application, which is an encryption/decryption application, requests a configuration of the embedded hardware that provides encryption/decryption acceleration, then the respective requests received from the first and the second applications may be in conflict because the configuration of the embedded hardware required for video processing acceleration may be different than the configuration of the embedded hardware required for encryption/decryption acceleration. One skilled in the art will appreciate that more than two applications may make conflicting requests for configuring and/or reconfiguring embedded hardware.

Conflicting requests for configuring and/or reconfiguring embedded hardware may be arbitrated based on security privileges, priorities, or any suitable combination thereof. For example, arbitration may be based on priorities of the requesting applications. Referring back to the above example, if the video application has a higher priority than the encryption/decryption application, then the configuration of the embedded hardware requested by the video application may be made available before the configuration of the embedded hardware requested by the encryption/decryption application. If more than two applications made conflicting requests then the requests for configuration and/or reconfiguration of the embedded hardware may be handled in an order corresponding to the priority of the application making the request. For example, the request for configuration and/or reconfiguration of the embedded hardware received from the application with highest priority may be handled first and the request for configuration and/or reconfiguration of the embedded hardware received from the application with lowest priority may be handled last.

For example, arbitration may be based on security privileges of the requesting applications where the security privileges are assigned on a per application basis. Referring back to the above example, if the video application is on a white list and the encryption/decryption application is on a black list, then the configuration of the embedded hardware requested by the video application may be made available and the configuration of the embedded hardware requested by the encryption/decryption application may not be made available.

Similarly, arbitration may be based on security privileges of the requesting applications where the security privileges are assigned on a per user basis. Referring back to the above example, if the video application is being operated by a user allowed to request configuration and/or reconfiguration of the embedded hardware and the encryption/decryption application is being operated by a user who is not allowed to request configuration and/or reconfiguration of the embedded hardware, then the configuration of the embedded hardware requested by the video application may be made available and the configuration of the embedded hardware requested by the encryption/decryption application may not be made available.

Arbitration may also be based on a combination of security privileges assigned on a per application basis and a per user basis. Referring back to the above example, if the video application is on a white list and the encryption/decryption application is being operated by a user who is not allowed to request configuration and/or reconfiguration of the embedded hardware, then the configuration of the embedded hardware requested by the video application may be made available and the configuration of the embedded hardware requested by the encryption/decryption application may not be made available.

Additional suitable factors, such as unstable device drivers associated with requests for configuring and/or reconfiguring embedded hardware, may also be used to arbitrate conflicts.

Arbitration may not be required if requests for configuring and/or reconfiguring embedded hardware received from different applications do not conflict. For example, if a first application, which is a video application, requests a configuration of the embedded hardware that provides video processing acceleration, and a second application, which is an image application, requests a configuration of the embedded hardware that provides image processing acceleration, then the respective requests received from the first and the second applications may not be in conflict because the configuration of the embedded hardware required for video processing acceleration may not be different than the configuration of the embedded hardware required for image processing acceleration. In such cases, the embedded hardware may be configured based on the configuration requested by the application whose request was received first. The configuration of the embedded hardware may not need to be changed to accommodate the request of the second application. One skilled in the art will appreciate that more than two applications may make non-conflicting requests for configuring and/or reconfiguring embedded hardware.

Device tree management module 124 may manage dynamic device tree module 132 of kernel module 130, which is described in greater detail below in connection with kernel module 130. Device tree management module 124 may be communicatively coupled to application interface 121, bitstream management module 122, dynamic device tree 132 of kernel module 130, and device tree 142 of FPGA 140. Device tree management module 124 may further manage the dynamics of the hardware of the embedded computer. The device tree of the embedded computer may be dynamic because the embedded hardware of the embedded computer is reconfigurable. Device tree management module 124 may indicate changes, additions, or removals to the configuration of the embedded hardware, as discerned by bitstream management module 122 from a bitstream received from an application, to dynamic device tree 132 of kernel module 130. For example, if based on analysis of a bitstream received by bitstream management module 122, bitstream management module 122 indicates that certain look up tables (LUTs) of FPGA 140 should be reconfigured to logic array blocks (LABs), then device tree management module 124 may pass this information on to dynamic device tree 132 of kernel module 130.

Configuration module 126 may provide an administration interface to FPGA management module 120. This administration interface may be accessible by users. Configuration module 126 may define security rules and exceptions, as described in greater detail above in connection with application interface 121. Configuration module 126 may also be used to log the operation of FPGA management module 120. For example, configuration module 126 may log what resources are being used by FPGA 140.

FPGA interface 128 may be communicatively coupled to bitstream management module 122 and FPGA programming module 136 of kernel module 130. Bitstream management module 122 may provide instructions to FPGA programming module 136 of kernel module 130 via FPGA interface 128.

Kernel module 130 may include dynamic device tree module 132, pin constraints module 134, and FPGA programming module 136.

Dynamic device tree module 132 may describe the hardware in the embedded computer. The OS may use this data to find and register hardware in the embedded computer. Dynamic device tree module 132 may be a data structure in the form of a tree of named nodes and corresponding properties. For example, dynamic device tree module 132 may describe the number and type of processors, serial interfaces, memory addresses and size of RAM. It may additionally describe the embedded hardware, such as what type of FPGA is included in the embedded computer and what components are in the FPGA.

Device tree management module 124 may further manage the dynamics of the device of the embedded computer. The device tree of the embedded computer may be dynamic because the embedded hardware of the embedded computer is reconfigurable. Dynamic device tree module 132 may be communicatively coupled to device tree management module 124 of FPGA management module 120.

Pin constraints module 134 may be communicatively coupled to bitstream management module 122 of FPGA management module 120. Pin constraints module 134 may determine electrical characteristics, such as pin constraints, of the board on which the embedded hardware, such as FPGA 140, may be implemented. Such electrical characteristics may be used by bitstream management module 122 of FPGA management module 120 to determine whether a received bitstream matches a board implementing the embedded hardware.

FPGA programming module 136 may be communicatively coupled to FPGA 140 and FPGA interface 136 of FPGA management module 120. FPGA programming module 136 may perform the configuration and/or reconfiguration of the embedded hardware, such as FPGA 140, upon receiving instructions from FPGA management module 120 to do so after completion of the analysis of a received bitstream by bitstream management module 122 of FPGA management module 120 as described above in connection with bitstream management module 122. FPGA programming module 136 may configure and/or reconfigure FPGA 140 by uploading a bitstream received from bitstream management module 122 to FPGA 140. FPGA programming module 136 may additionally handle programming device drivers specific to FPGA 140.

FPGA 140 denotes the embedded hardware to be configured and/or reconfigured by a bitstream received from applications 110, 112, or 114. In an embodiment, FPGA 140 may be any reconfigurable integrated circuit, such as a PLD or an FPGA.

FPGA 140 may include device tree 142.

Figure 2:
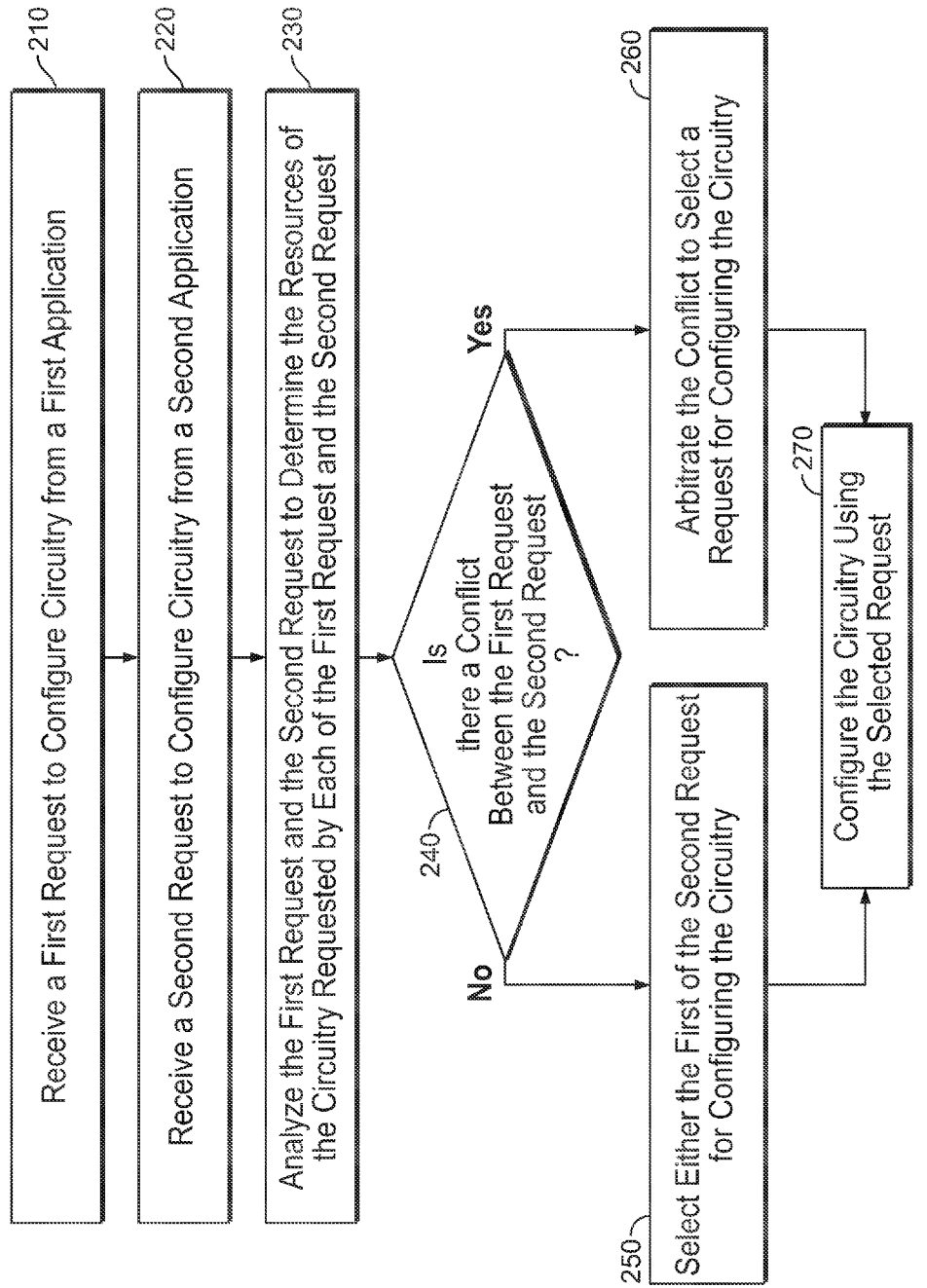
FIG. 2 is a simplified flow diagram for arbitrating a conflict between two or more requests for reconfiguring a run-time hardware configuration, according to an illustrative embodiment.

FIG. 2 is a simplified flow diagram for arbitrating a conflict between two or more requests for reconfiguring a run-time hardware configuration, according to an illustrative embodiment.

At 210, a first request to configure and/or reconfigure circuitry may be received from a first application. For example, a video processing application may transmit a request to the API to configure and/or reconfigure embedded hardware, such as FPGA 140 of FIG. 1, of the embedded computer to provide video acceleration components. Such a request may be received by the API in a substantially similar manner as described above in connection with FIG. 1.

At 220, a second request to configure and/or reconfigure circuitry may be received from a second application. For example, an encryption/decryption application may transmit a request to the API to configure and/or reconfigure embedded hardware, such as FPGA 140 of FIG. 1, of the embedded computer to provide encryption/decryption acceleration components. Such a request may be received by the API in a substantially similar manner as described above in connection with FIG. 1.

At 230, the first and the second received requests may be analyzed to determine the resources of the circuitry requested by each of the first request and the second request. For example, as described above in connection with FPGA management module 120 of FIG. 1, the bitstreams corresponding to the requests for configuration and/or reconfiguration of the embedded hardware received from applications may be processed and checked by bitstream management module 122 of FIG. 1. The received bitstreams may be processed to determine whether the bitstreams are valid for the embedded hardware, e.g., FPGA 140 of FIG. 1, whether the bitstreams are appropriate for the board on which the embedded hardware is implemented, and to check what resources of the embedded hardware are being requested.

At 240, a determination may be made as to whether there is a conflict between the first request and the second request. FPGA management module 120 may make this determination in a substantially similar manner as described above in connection with FPGA management module 120. In response to a determination that there is a conflict between the first and the second requests, the process proceeds to 260, otherwise the process proceeds to 250.

At 250, either the first request or the second request for reconfiguring the circuitry may be selected for processing. For example, as described above in connection with FPGA management module 120 of FIG. 1, the embedded hardware may be configured based on the configuration requested by the application whose request was received first. The configuration of the embedded hardware may then need not be changed to accommodate the second request. Alternatively, embedded hardware may be configured based on the configuration requested by the application whose request was received second. The configuration of the embedded hardware may then need not be changed to accommodate the first request.

At 260, the conflict between the first request and the second request may be arbitrated to select a request for reconfiguring the circuitry. Arbitration of the conflict may proceed in a manner substantially similar to the description of arbitration described above in connection with FPGA management module 120 of FIG. 1.

At 270, the circuitry may be reconfigured using the selected request. Configuration and/or reconfiguration of the embedded hardware may be substantially similar to the description of kernel module 130 of FIG. 1.

The following are some exemplary use cases of the applicability of run-time hardware configuration change management architecture 100 of FIG. 1.

A reconfigurable computer. Devices such as FPGA's may ably assist a central processing unit (CPU) on applications such as video processing, image processing, encryption/decryption, among many others. For example, an FPGA may provide suitable video processing hardware acceleration desired by a video processing application, suitable image processing hardware acceleration desired by a image processing application, and suitable encryption/decryption hardware acceleration desired by a encryption/decryption application. However, it may not be possible for an FPGA to hold all the hardware required by all of these applications. Instead, it may be better to reconfigure the FPGA on demand.

In multitasking and multi-user operating systems such as UNIX/Linux, it is required the applications request hardware configurations because conflicting requests may be issued. The run-time hardware configuration change management architecture framework described herein provides a solution to this problem. An inspection of a bitstream received from a requesting application may make certain that the resources requested by a bitstream are available from the FPGA. An application requesting a configuration that conflicts with a current resource status of the FPGA may either be set to sleep, i.e., blocked, or asked to request the configuration again later relying on the blocking and non-blocking features of the API.

Resource Reservation. For example, a system may need to check certificates at all times. For efficiency, such checking may be best done by an FPGA. This means the FPGA resources may need to be locked or reserved specifically for checking certificates. The run-time hardware configuration change management architecture may enable this via application priority management: by setting the priority of the certificate management application to be high, the system will never remove or evict the certificate management application from using the FPGA resources. Only a privileged user may be able to evict the certificate management application from using the FPGA resources.

Reconfiguration of devices in the field. For example, consider mobile phone cell towers and the multitude of mobile devices are spread in the field. The telecommunication service provider may issue a new configuration (bitstream, drivers, or device tree) for mobile phone towers. The new configuration may be picked up by an update application running on the mobile phone towers. The down time of mobile phone towers may be minimized since restarting the entire system may not be required.

The run-time hardware configuration change management architecture may provide protection against hackers. On open operating systems, security is very important. Accordingly, the run-time hardware configuration change management architecture provides security privileges on a per user and per application basis. The run-time hardware configuration change management architecture may also manage a black list of drivers that are known to be problematic.

Figure 3:
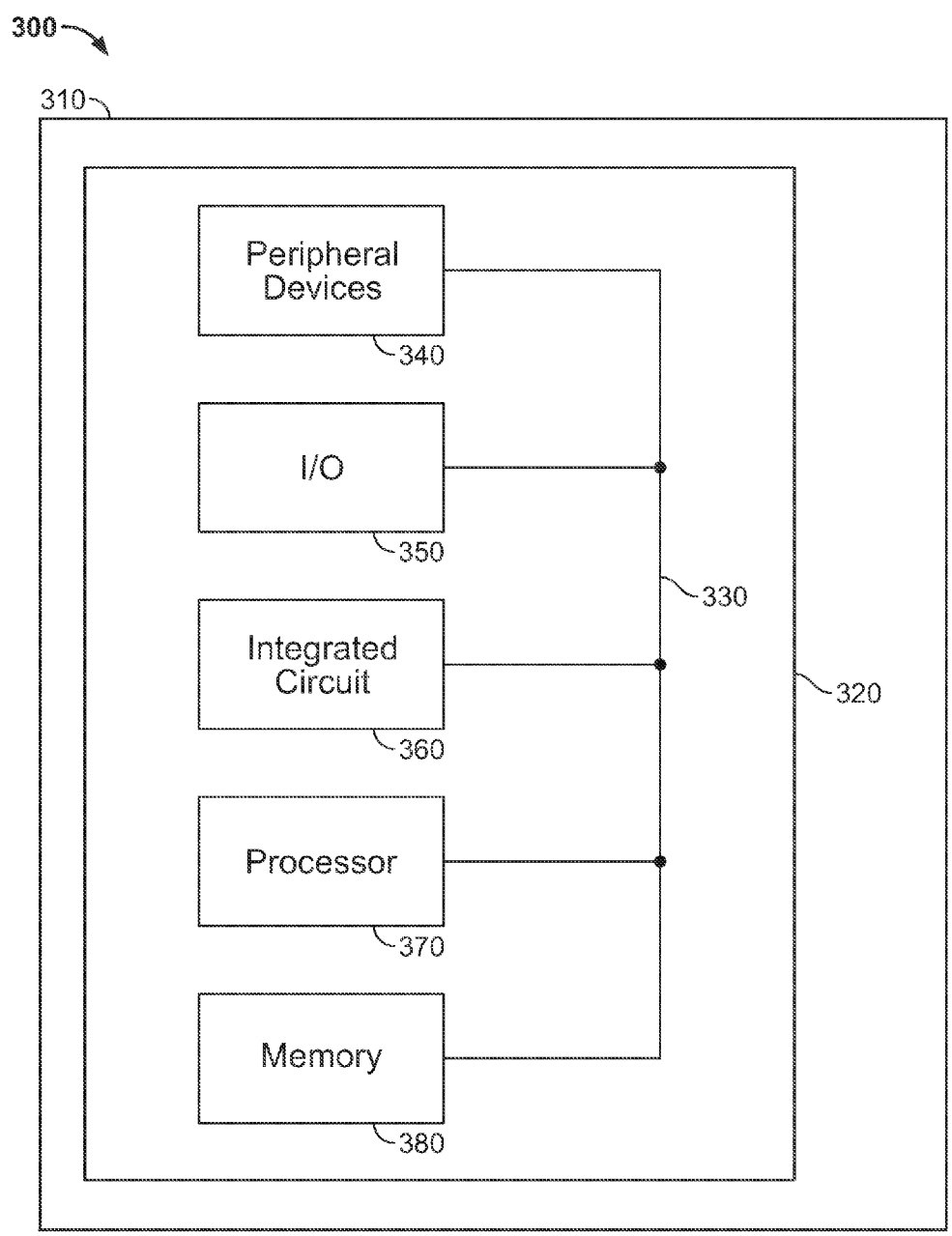
FIG. 3 illustrates a circuit or other device that includes embodiments of the circuits described herein as being within a data processing system.

FIG. 3 illustrates a circuit or other device that includes embodiments of the circuits described herein as being within a data processing system. In an embodiment, the circuit or device may be an integrated circuit, application specific standard product (ASSP), application specific integrated circuit (ASIC), programmable logic device (PLD), full-custom chip, or dedicated chip. In an embodiment, circuit 360 may be substantially similar to run-time hardware configuration change management architecture 100. Data processing system 300 can include one or more of the following components: a processor 370, memory 380, I/O circuitry 380, and peripheral devices 340. These components are connected together by a system bus or other interconnections 330 and are populated on a circuit board 320 which is contained in an end-user system 310.

System 300 could be used in a wide variety of applications, such as computer networking, data networking, instrumentation, video processing, digital signal processing, or any other application where the advantage of using programmable or reprogrammable logic is desirable. Circuit 360 can be used to perform a variety of different logic functions. For example, circuit 360 can be configured as a processor or controller that works in cooperation with processor 370. Circuit 360 may also be used as an arbiter for arbitrating access to a shared resource in system 300. In yet another example, circuit 360 can be configured as an interface between processor 370 and one of the other components in system 300. It should be noted that system 300 is only exemplary, and that the true scope and spirit of the invention should be indicated by the following claims.

Although components in the above disclosure are described as being connected with one another, they may instead be connected to one another, possibly via other components in between them. It will be understood that the foregoing are only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

What is claimed is:

1. A method for configuring hardware circuitry, the method comprising:
receiving at a management module, from a first application, a first request for configuring the hardware circuitry at run-time;
receiving at the management module, from a second application, a second request for configuring the hardware circuitry at run-time;
receiving a blocking indication indicating whether blocking should be implemented in the event of a conflict;
identifying, using the management module, the conflict between the first request and the second request;
arbitrating the conflict, using the management module in response to identifying the conflict, to select one of the first request and the second request for configuring the hardware circuitry at run-time;
when the blocking indication indicates that blocking should be implemented, blocking an unselected one of the first request and the second request, such that the unselected one of the first request and the second request is not implemented;
configuring the hardware circuitry at run-time using the selected one of the first request and the second request; and
when the blocking indication indicates that blocking should not be implemented:
temporarily suspending the unselected one of the first request and the second request until the unselected one of the first request and the second request can be implemented without the conflict; and
reconfiguring the hardware circuitry at run-time using the unselected one of the first request and the second request when the unselected one of the first request and the second request can be implemented without the conflict.

2. The method of claim 1, wherein the first request is a first bitstream and the second request is a second bitstream, and wherein identifying the conflict comprises:
analyzing each of the first bitstream and the second bitstream to determine resources of the hardware circuitry requested by each bitstream; and
determining a conflict between the first bitstream and the second bitstream if the resources of the hardware circuitry requested by the first bitstream have at least one component in common with the resources of the hardware circuitry requested by the second bitstream.

3. The method of claim 2, wherein configuring the hardware circuitry further comprises loading the selected one of the first bitstream and the second bitstream onto the hardware circuitry.

4. The method of claim 1 further comprising:
selecting the first request for configuring the hardware circuitry at run-time in response to determining no conflict between the first request and the second request.

5. The method of claim 1, wherein arbitrating the conflict comprises selecting one of the first request and the second request based on at least one of security permissions, priority, and drivers associated with each of the first request and the second request.

6. The method of claim 1 further comprising verifying that the first request matches a board implementing the hardware circuitry.

7. The method of claim 1, wherein the management module is implemented as an application programming interface in user space of an operating system.

8. The method of claim 7, wherein the management module interfaces with kernel space to configure the hardware circuitry.

9. A system for configuring hardware circuitry, the system comprising: a management module for:
receiving, from a first application, a first request for configuring the hardware circuitry at run-time;
receiving, from a second application, a second request for configuring the hardware circuitry at run-time;
receiving a blocking indication indicating whether blocking should be implemented in the event of a conflict;

identifying the conflict between the first request and the second request;

arbitrating the conflict, in response to identifying the conflict, to select one of the first request and the second request for configuring the hardware circuitry at run-time;

when the blocking indication indicates that blocking should be implemented, blocking an unselected one of the first request and the second request, such that the unselected one of the first request and the second request is not implemented;

configuring the hardware circuitry at run-time using the selected one of the first request and the second request; and when the blocking indication indicates that blocking should not be implemented:

temporarily suspending the unselected one of the first request and the second request until the unselected one of the first request and the second request can be implemented without the conflict, and reconfiguring the hardware circuitry at run-time using the unselected one of the first request and the second request when the unselected one of the first request and the second request can be implemented without the conflict.

10. The system of claim 9, wherein the first request is a first bitstream and the second request is a second bitstream, and wherein the management module further identifies the conflict by:

analyzing each of the first bitstream and the second bitstream to determine resources of the hardware circuitry requested by each bitstream; and determining a conflict between the first bitstream and the second bitstream if the resources of the hardware circuitry requested by the first bitstream have at least one component in common with the resources of the hardware circuitry requested by the second bitstream.

11. The system of claim 10, wherein the management module configures the hardware circuitry by loading the selected one of the first bitstream and the second bitstream onto the hardware circuitry.

12. The system of claim 9, wherein the management module further:

selects the first request for configuring the hardware circuitry at run-time in response to determining no conflict between the first request and the second request.

13. The system of claim 9, wherein the management module arbitrates the conflict by selecting one of the first request and the second request based on at least one of security permissions, priority, and drivers associated with each of the first request and the second request.

14. The system of claim 9, wherein the management module further verifies that the first request matches a board implementing the hardware circuitry.

15. The system of claim 9, wherein the management module is implemented as an application programming interface in user space of an operating system.

16. The system of claim 15, wherein the management module interfaces with kernel space to configure the hardware circuitry.

17. A system for reconfiguring hardware at run-time, the system comprising:

a management module for:

receiving a first and a second bitstream for reconfiguring the hardware at run-time;

receiving a blocking indication indicating whether blocking should be implemented in the event of a conflict;

identifying the conflict between the first bitstream and the second bitstream;

arbitrating the conflict to select one of the first bitstream and the second bitstream for reconfiguring the hardware at run-time;

when the blocking indication indicates that blocking should be implemented, blocking an unselected one of the first bitstream and the second bitstream, such that the unselected one of the first bitstream and the second bitstream is not implemented;

reconfiguring the hardware at run-time using the selected one of the first bitstream and the second bitstream; and when the blocking indication indicates that blocking should not be implemented:

temporarily suspending the unselected one of the first bitstream and the second bitstream until the unselected one of the first bitstream and the second bitstream can be implemented without the conflict, and reconfiguring the hardware at run-time using the unselected one of the first bitstream and the second bitstream when the unselected one of the first bitstream and the second bitstream can be implemented without the conflict.

18. The system of claim 17, wherein the management module reconfigures the hardware by loading the selected one of the first bitstream and the second bitstream onto the hardware.

19. The system of claim 17, wherein the management module further:

selects the first request for reconfiguring the hardware at run-time in response to determining no conflict between the first request and the second request.

20. The system of claim 17, wherein the management module is implemented as an application programming interface in user space of an operating system.

\* \* \* \* \*